United States Patent Office 2,981,733
Patented Apr. 25, 1961

2,981,733

N-BIS(p-DIALKYLAMINOPHENYL)METHYL DERIVATIVES OF NITROGEN - CONTAINING SATURATED HETEROCYCLIC COMPOUNDS

Frederick H. Kranz, Buffalo, N.Y., assignor to Allied Chemical Corporation, New York, N.Y., a corporation of New York No Drawing. Filed May 12, 1958, Ser. No. 734,418

14 Claims. (Cl. 260—247.5)

This invention relates to compounds which are derivatives of bis(p-dialkylaminoaryl)methane in which nitrogen is linked to the methane carbon atom. It relates more particularly to compounds of said type having superior properties as compared to known compounds of said general class.

An object of the present invention is to provide novel dreivatives of bis(p-dialkylaminoaryl)methane, and especially of bis(p-dimethylaminophenyl)methane, in which the methane carbon atom thereof is linked to the nitrogen atom of a nitrogen-containing radical having a beneficial effect upon the properties of said derivatives.

A further object of the present invention is to provide novel bis(p-dialkylaminoaryl)methyl derivatives of said type which are lightly colored or substantially colorless but which when contacted with acidic electron acceptors produce colored compositions.

Another object of the present invention is to provide novel compounds of said type having superior solubility in organic solvents, and superior stability as compared to N-bis(p-dimethylaminophenyl)methyl aniline (also known as N-phenyl leucoauramine) and derivatives of the latter when embodied in manifold record systems of the type disclosed in U.S. Patents 2,505,470 and 2,548,366, for example.

Other objects of the invention will in part be obvious and will in part appear hereinafter.

It is known that N-phenyl derivatives of leucoauramine, e.g., N-bis(p-dimethylaminophenyl)methyl aniline, and such compounds as crystal violet lactone turn from colorless to a deep blue or violet shade, when dissolved in non-polar solvents, such as, benzene, toluene or chlorinated biphenyl, and brought into contact with acidic electron acceptors such as kaolin, bentonite, attapulgite, silica gel, felspar, pyrophyllite, halloysite, magnesium trisilicate, zinc suplhate, zinc sulfide, calcium fluoride, and calcium citrate, as well as organic acids such as tannic acid and benzoic acid.

Compounds which are derivatives of bis(p-dimethylaminophenyl)methane in which the nitrogen atom of a phenylamino radical replaces one of the methane hydrogen atoms, such as N-phenyl leucoauramine, are known compounds which are colorless or substantially colorless, but which constitute color-reactants of the electron donor type, since they turn blue on coming into absorptive contact with acidic electron acceptor materials such as acidic clays (for example, attapulgite, halloysite, kaolin and bentonite), as well as aluminum sulfate, zeolite material, silica gel, magnesium trisilicate, and zinc sulphide, among others. They have been proposed for use heretofore in solution in toluene or chlorinated biphenyl for printing in color on paper or other material coated or filled with such acidic materials. Thus, they have been proposed for use in so-called "colorless carbon papers," impact printing papers and duplicating manifold record systems; for example, of the type disclosed in U.S. Patent 2,505,- 470, wherein a solution of the N-bis(p-dimethylaminophenyl)methyl aniline is provided in the form of discrete particles in conjunction with a solid insulating material including an organic hydrophilic film-forming material and an acidic clay which, upon pressure by a stylus or impact, as by typewriter type, causes combination of the color-forming reactant with the clay and a resulting colored mark; and, for example, of the type disclosed in U.S.P. 2,548,366, wherein the rear surface of each top sheet of a series of overlying sheets is coated with a dispersion of a suitable solution of the N-bis(p-dimethylaminophenyl)methyl aniline in a rupturable hydrophilic colloid film, and the adjacent top surface of the next underlying sheet is coated or filled with an electron-acceptor acidic clay, so that pressure of a stylus or impact upon the top sheet causes color-formation on the surface containing the acidic clay at the points of pressure or impact.

I have discovered that a novel class of compounds, namely N-bis(p-dimethylaminophenyl)methyl derivatives of nitrogen-containing saturated heterocyclic compounds, and related compounds, in which a hetero nitrogen atom of a nitrogen-containing saturated heterocylcic nucleus replaces one of the methane hydrogen atoms of bis(p-dimethylaminophenyl)methane, possess superior properties which render them particularly useful in systems of the above type.

The compounds of the present invention are N-bis(p-dialkylaminoaryl)methyl derivatives of nitrogen-containing saturated heterocyclic compounds in which the alkyl groups of the dialkylamino radical each have 1 to 5 carbon atoms and the aryl radicals are mononuclear aryl radicals. That is to say, they are saturated heterocyclic imino derivatives of bis(p-di-lower alkylamino-mononuclear aryl)methane in which a hetero nitrogen atom of a saturated nitrogen-containing heterocyclic nucleus is linked to the methane carbon atom and to two adjacent carbon atoms of the saturated heterocyclic nucleus. They include compounds which in themselves are colored (containing chromophoric groups) and compounds which are lightly colored, or colorless, or substantially colorless (free from chromophoric groups). Further, they include compounds which include in their molecules acidic groups containing a hydrogen cation (for example, a sulfonic acid or carboxylic acid radical), and compounds free from such acidic groups. In this connection it is noted that groups which do not contain a hydrogen cation, such as salts of acidic groups (e.g., alkali metal, ammonium, organic base and other salts of carboxylic and sulfonic acids) are included herein as being free from acid groups containing a free hydrogen cation.

Preferred compounds of the present invention are free from both chromophoric groups and from acidic groups containing a hydrogen cation, since such preferred compounds are lightly colored or substantially colorless or colorless in the solid form (leuco form), which renders them of special utility in the manufacture of impact printing and duplicating materials of the type referred to above.

The alkyl radicals of the p-dialkylamine radicals are lower alkyl radicals, including methyl, ethyl, propyl, butyl and amyl radicals. Compounds in which they are methyl or ethyl are preferred.

The mononuclear aryl radicals include unsubstituted phenylene radicals and phenylene radicals containing one or more inert substituents such as alkyl, alkoxy, halogen or acylamino substituents; for example, tolyene, methoxylphenylene, chlorophenylene, bromophenylene, etc. Compounds in which they are mononuclear aryl hydrocarbon radicals, and especially phenylene, are preferred.

The nitrogen-containing saturated heterocylic radicals of the compounds of the present invention include various types of saturated nitrogen-containing heterocyclic radicals in which at least one hetero nitrogen atom, which forms the linking point of the radical, is linked to two adjacent saturated carbon atoms of a heterocyclic nucleus containing at least 5 ring members and preferably 5 to 6 ring members. (As employed herein, including the claims, the term "saturated carbon atom" denotes a carbon atom which is linked to four separate atoms.) Thus, they include saturated heterocyclic radicals which include, besides nitrogen and saturated carbon atoms, oxygen, sulfur and/or additional nitrogen atoms as hetero components. They also include condensed polynuclear radicals of which one is a saturated nitrogen-containing heterocyclic radical having the said structure, and they include radicals in which hydrogen atoms of the heterocyclic nucleus are replaced by substituent atoms or groups. Preferably they are free from chromophoric groups and from acidic groups containing a hydrogen cation, which would interfere with their use as leuco electron-donor color reactants. They may, however, contain such substituents as alkyl, aralkyl, hydroxyalkyl, alkoxy, hydroxyalkoxy, aryl, aroxy, halogen, dialkylamino, acylamino and sulfonamido groups.

The N-bis(p-dialkylaminoaryl)methyl heterocylic compounds of the present invention have the formula

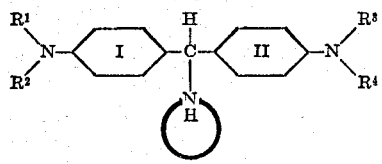

wherein $R^1$, $R^2$, $R^3$ and $R^4$ are each an alkyl radical having 1 to 5 carbon atoms (such as, methyl, ethyl, propyl, butyl or amyl),

represents a saturated nitrogen-containing heterocyclic radical of at least 5 ring members in which at least one hetero nitrogen atom is linked to two adjacent saturated carbon atoms, such as, pyrrolidyl, piperidyl, morpholinyl or piperazinyl radicals, including substituted derivatives of such radials and preferably those free from chromophoric groups and from acidic groups containing a hydrogen cation, such as the alkyl (e.g. methyl, ethyl, propyl, butyl, amyl, hexyl, octyl, dodecyl, hexadecyl, octadecyl or octadecenyl), cycloalkyl (e.g. cyclopentyl, cyclohexyl or methyl cyclohexyl), alkoxy, hydroxyalkyl, hydroxyalkoxy, fluorine, chlorine, bromine, nitro, aryl, aroxy, dialkylamino, acylamino, sulfamido or condensed cycloalkyl derivatives of the radicals referred to above, and

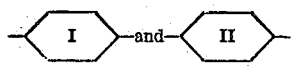

are selected from the group consisting of the phenylene radical and substituted derivatives thereof, preferably those free from chromophoric groups and from acidic groups containing a hydrogen cation (such as the alkyl, alkoxy, fluorine, chlorine, bromine, dialkylamino, acylamino or sulfamido derivatives thereof).

Examples of such compounds are:

1-[bis(p-dimethylaminophenyl)methyl]-pyrrolidine
1-[bis(p-dimethylaminophenyl)methyl]-piperidine
1-[bis(p-diethylaminophenyl)methyl]-piperidine
4-[bis(p-dimethylaminophenyl)methyl]-morpholine
4-[bis(p-diethylaminophenyl)methyl]-morpholine
1-[bis(p-dimethylaminophenyl(methyl]-piperazine
1-[bis(p-dimethylaminophenyl)methyl]-4-methyl - piperazine
1-[bis(p-dimethylaminophenyl)methyl]-4 - hydroxyethylpiperazine 1,4-bis[bis(p-dimethylaminophenyl)methyl]-piperazine
1,4-bis[bis(p-diethylaminophenyl)methyl]-piperazine.

Those compounds are of particular value in which $R^1$, $R^2$, $R^3$ and $R^4$ are methyl or ethyl, the phenylene radicals are mononuclear aryl hydrocarbon radicals,

is morpholinyl, piperidyl, piperazinyl or pyrrolidyl.

The compounds of the present invention are soluble in a wide variety of organic solvents. Thus, they have good solubility not only in the usual solvents such as benzene, toluene, dioctylphthalate and chlorinated biphenyls, but also possess greatly superior solubility in petroleum hydrocarbon solvents such as kerosene, white mineral oil and naphthas as well as in alcoholic solvents such as alcohols and glycols. When applied as a solution in such solvents to paper or other material coated with an acidic material, such as bentonite, kaolin, felspar, mono- or dibasic barium or calcium phosphates, tannic acid or benzoic acid, they produce generally blue to violet colorations instantly; and the colored combinations thus formed are stable and fast to light. In addition, they possess relatively low volatility and high stability to air and light. These advantageous properties render the lightly colored to colorless compounds of the present invention outstanding for use in systems of the above type.

Thus, the compounds of the present invention are useful in the formation of colored compounds or differently colored compounds by contact with electron acceptor or acidic materials which cause a rearrangement of the chemical molecule of compounds of said class with intensification of the color thereof, such as those enumerated above.

Lightly colored, and especially colorless or substantially colorless, compounds of this invention are particularly useful in so-called "colorless carbon papers" and duplicating manifold record systems of the type referred to above, because of their superior solubility and stability both in the leuco form and in the colored form obtained by contact with an acidic electron acceptor. Thus, in the leuco form they are stable to storage in containers open to the atmosphere, as well as when incorporated into record sheets of the type disclosed in U.S. Patents 2,548,366 and 2,712,507 and exposed to the atmosphere and to light. In the form of colored compounds formed by contact with acidic electron acceptors of the type referred to above, they are stable to light and to the atmosphere, even when embodied as record sheet material exposed to daylight. This is in contrast to N-phenyl leucoauramine and related compounds, which when incorporated into record sheet material of the type disclosed, for example, in U.S. Patents 2,548,366 and 2,712,-507, are unstable and/or volatilize or rapidly become ineffective; and in contrast to the rapid fading of the color produced by contact of acidic clays with crystal violet lactone heretofore employed commercially. Further, they do not stain the skin when the record sheets are handled.

For example, when the compound of Example 1 of the present application is substituted for the mixture of crystal violet lactone and methylene base employed in Example 1 of U.S.P. 2,548,366, the resulting sheets are stable during storage for long periods of time and when placed one above the other, with the clay-coated surfaces upward, and marked with a stylus, an intense reddish blue marking is instantly developed on the clay-coated surface of the lower sheet where pressure was applied, which marking does not fade.

The compounds of the present invention can be prepared in various ways. The simplest method from the standpoint of availability of starting materials and apparatus required involves the condensation of a bis(p-dialkylaminoaryl)methyl hydrol having the formula

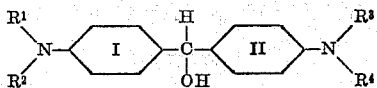

with a saturated heterocyclic nitrogen compound having a hydrogen atom attached to at least one hetero nitrogen atom (a saturated heterocyclic imine), and having the formula

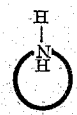

wherein $R^1$, $R^2$, $R^3$, $R^4$,

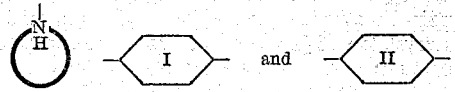

have the meaning given above, preferably in substantially equimolar amounts. The condensation is preferably carried out by heating in a solvent at a temperature between 80° and 150° C. (All ranges given herein, including the claims, are inclusive of the limits.)

The general method of preparation preferably consists in refluxing substantially equimolecular proportions of the benzhydrol and of the saturated heterocyclic imine in a suitable solvent having a boiling point between 80° and 150° C., at least a fraction of each of the two reactants being soluble in the solvent. Suitable solvents are for example, hydrocarbon solvents, such as petroleum hydrocarbons (such as 2,2,4-trimethylpentane and low boiling kerosene fractions), aromatic hydrocarbons (such as benzene, toluene or zylene), and mixtures preferably having a boiling range between 80° and 150° C., and alcohols, such as ethyl, propyl or butyl alcohols or mixtures thereof. When effected in a hydrocarbon solvent, water formed in the reaction is preferably removed. The N-bis(p-dialkylaminoaryl)methyl heterocyclic compounds thus obtained may be purified by recrystallization from a suitable solvent.

The following are illustrative of hydrols which are suitable for use in the process:

Michler's hydrol: 4,4'-bis(dimethylamino)benzhydrol
4,4'-bis(diethylamino)benzhydrol
4,4'-bis(dipropylamino)benzhydrol
4,4'-bis(dibutylamino)benzhydrol
4,4'-bis(dimethylamino)-2,2'-dichloro-benzhydrol
4,4'-bis(dimethylamino)-3,3'-dimethyl-benzhydrol
4,4'-bis(diethylamino)-2,2'-dibromo-benzhydrol The following are illustrative of saturated heterocyclic nitrogen compounds which are suitable for use in the process, alone or in the form of mixtures of two or more of them:

Pyrrolidine
2-methyl pyrrolidine
2-ethyl pyrrolidine
2-propyl pyrrolidine
Piperidine
2-methyl piperidine
3-methyl piperidine
2,4-dimethyl piperidine
2,5-dimethyl piperidine
2,6-dimethyl piperidine
2-ethyl piperidine
3-ethyl piperidine
2-propyl piperidine
3,4-dibromo-2,2,6,6-tetramethyl piperidine
Piperazine
N-methyl piperazine
N-hydroxyethyl piperazine
Morpholine
Alkyl morpholines
Thiomorpholine
Hexamethylene imine
2-methyl hexamethylene imine
Heptamethylene imine
Decahydroquinoline The invention will be illustrated by the following specific examples, but it is to be understood that it is not limited to the details thereof and that changes may be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

*Example 1*

In a round-bottom, three-necked flask, equipped with a stirrer, thermometer, and reflux condenser provided with a water separator, were charged in the following order:

150 parts by volume of toluene
100 parts by volume of xylene
62 parts of Michler's hydrol (commercial grade, 82% strength, equivalent to 0.2 mol. 100%)
2 parts of sodium carbonate (to neutralize the mineral acidic impurities present in the commercial hydrol)
20 parts by volume of water
17 parts of piperidine (equivalent to 0.2 mol)

The mixture was heated to a boiling point of 118°–120°, which was attained by distilling off the water added with the reactants, and then refluxed at that temperature. Heating was continued for 24 hours with reflux at said temperature, the water formed by the reaction being removed by means of the separator. The reaction mass was then filtered to remove insoluble impurities, the solids were washed with 25 parts by volume of a mixed solution of 10 parts by volume of xylene and 18 parts by volume of toluene. The filtrate was cooled to −10°, and the crystals which separated were filtered and dried in vacuo. The crude bis(p-dimethylaminophenyl)piperidyl methane thus obtained was dissolved in a boiling mixture of 125 parts by volume of toluene and 250 parts by volume of isopropyl alcohol, 2 parts of decolorizing carbon (Nuchar) were added, and the solution was filtered hot and then cooled to room temperature to crystallize. The crystals were recovered by filtration and dried in vacuo.

The product was in the form of substantially colorless to pale yellow needle-like crystals having a melting point of 156°–157°. It corresponds to the formula:

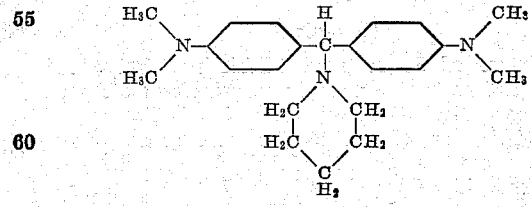

When dissolved in toluene and poured onto a sheet of paper coated with attapulgite, a deep violet-blue developed instantaneously.

*Example 2*

A mixture of 32.6 parts (0.1 mol) of 4,4'-bis(diethylamino)benzhydrol, 8.5 parts (0.1 mol) of piperidine and 200 parts by volume of ethyl alcohol (2B denatured) was heated to boiling and refluxed (80°) for 42 hours. The mixture was allowed to stand for 3 days, and the crystals obtained were filtered off at room temperature and vacuum dried at 35°–40°. The crude bis(p-diethylaminophenyl)piperidyl methane thus obtained was dissolved in 100 parts by volume of a 1:2 mixture of isopropyl alcohol and toluene, at the boil. Two parts of decolorizing carbon (Nuchar) were added to the solution, which was filtered hot through a filter coated with dry filter cel. The filtrate was cooled to 0°. The resulting crystals were filtered, washed with 20 parts by volume of the isopropyl alcohol-toluene mixture, and vacuum dried at 35°–40°.

The crystalline product thus obtained was essentially colorless and melted at 125°. It corresponds to the formula

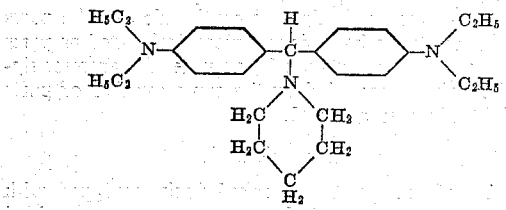

When a solution thereof in toluene was poured onto paper coated with bentonite clay, a deep reddish blue coloration was obtained immediately.

*Example 3*

A mixture of 32.6 parts (0.1 mol) of 4,4'-bis(diethylamino)benzhydrol, 8.7 parts (0.1 mol) of morpholine and 200 parts by volume of ethyl alcohol (2B denatured) was heated to boiling and refluxed (80°–81°) for 50 hours. The reaction mixture was allowed to cool to room temperature and then placed in a refrigerator for 2 days. The resulting crystals were filtered off, washed with 20 parts by volume of alcohol (2B), and dried at 35°–40°. The crude product was heated to boiling with 75 parts by volume of a hot 1:2 mixture of isopropyl alcohol and toluene, and the mass was cooled and filtered. The cake was washed with 25 parts by volume of the same isopropyl alcohol-toluene mixture and dried at 35°–40°.

The crystalline bis(p-diethylaminophenyl)morpholinyl methane thus obtained was essentially colorless and melted at 123°–124°. It corresponds to the formula:

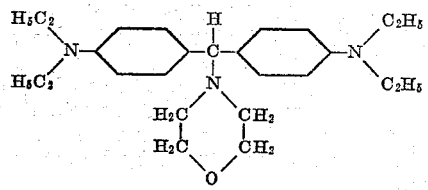

When a solution thereof in toluene was poured onto paper coated with bentonite clay, a deep reddish blue coloration was immediately obtained.

*Example 4*

A mixture of 30 parts of Michler's hydrol (90% strength), 10 parts of N-methyl piperazine, and 175 parts by volume of alcohol (2B) was heated to boiling and refluxed (80°) for 43 hours. The reaction mass was cooled to room temperature and filtered. The filter cake was washed with 25 parts by volume of alcohol (2B) and dried in a vacuum drier at 40°–45°.

The crystalline bis(p-dimethylaminophenyl)N-methylpiperazinyl methane thus obtained was essentially colorless and melted at 174°. It corresponds to the formula:

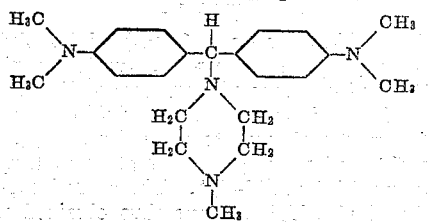

When a solution thereof in toluene was poured onto paper coated with bentonite clay, a green coloration was instantly obtained which quickly turned blue.

*Example 5*

A mixture of 30 parts of Michler's hydrol (90% strength), 13.1 parts of hydroxyethyl piperazine, and 175 parts by volume of alcohol (2B) was heated to boiling and refluxed (79°) for 50 hours. Two parts of decolorizing carbon (Nuchar) were then added and the mass was sludge filtered hot through a dry filter cel bed. The filtrate was cooled to room temperature and then placed in the freezing compartment of a refrigerator for two days. The crystals thus obtained were filtered off, washed with 50 parts by volume of alcohol (2B), and dried in a vacuum drier at 35°–40°.

The bis(p-dimethylaminophenyl)N-hydroxyethylpiperazinyl methane thus obtained was composed of colorless crystals which melted at 135°. It corresponds to the formula:

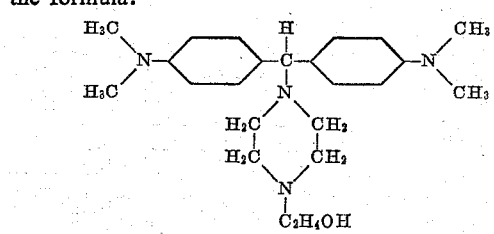

A solution thereof in toluene poured onto a surface coated with bentonite clay gave a deep blue color instantaneously.

*Example 6*

A solution of 19.5 parts of piperazine hydrate in 250 parts by volume of toluene was refluxed while continuously removing water until the water of hydration was removed. 100 parts by volume of benzene and 60 parts of Michler's hydrol (90%) were added, and the mixture was refluxed for 50 hours at 102° and then processed as described in Example 1.

The crystalline 1,4-bis[bis(p-dimethylaminophenyl)methyl]piperazine thus obtained was essentially colorless and had a melting point of 283°. It corresponds to the formula:

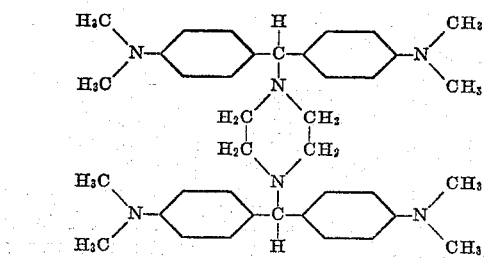

When a solution thereof in toluene was poured onto paper coated with bentonite clay, a deep blue coloration was obtained immediately.

*Example 7*

A solution of 19.5 parts of piperazine hydrate (equivalent to 0.1 mol) in 250 parts by volume of toluene was refluxed at 111° with agitation while continuously removing water, until the water of hydration was removed. The mass was cooled to room temperature and 100 parts by volume of benzene and 65.2 parts of 4,4'-bis(diethylamino)benzhydrol (100%, equivalent to 0.2 mol) were added, and the mixture was refluxed for 37 hours at 100°. The reaction mixture was allowed to cool to room temperature and the resulting crystals were filtered off and dried in vacuo at 30–35°.

The substantially white crystalline 1,4-bis[bis(p-diethylaminophenyl)methyl]piperazine thus obtained has a melting point of 260°. When a solution thereof in toluene was poured onto a surface coated with bentonite clay, a deep greenish blue color was obtained almost instantly.

It will be evident to those skilled in the art that the invention is not limited to the details of the foregoing illustrative examples and that changes can be made without departing from the scope of the invention.

Thus, instead of the hydrols and saturated heterocyclic nitrogen compounds employed in the examples, others of those specified above may be substituted in equivalent amounts. Further, instead of the hydrol, the corresponding bis(p-dialkylaminoaryl)methyl chloride or bromide may be used.

I claim:

1. Saturated heterocyclic imino derivatives of bis(p-dialkylaminoaryl)methane having the formula

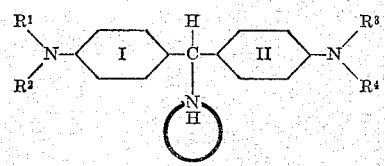

wherein $R^1$, $R^2$, $R^3$ and $R^4$ are each selected from the group consisting of the lower alkyl radicals;

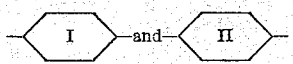

are each selected from the group consisting of the unsubstituted phenylene radical and the phenylene radical monosubstituted by a member of the group consisting of lower alkyl, lower alkoxy, fluorine, chlorine, bromine, di-lower alkylamino, lower alkanoylamino and —$SO_2NH_2$,

represents a nitrogen-containing heterocyclic radical of which the heterocyclic nitrogen atom forms the linking point to the methane carbon atom and which radical is selected from the group consisting of pyrrolidino, piperidino, morpholino, thiomorpholino, hexamethylene imino, methylhexamethylene imino, heptamethylene imino, and piperazino, at least one of the piperazino nitrogen atoms forming the linking point to the methane carbon atom of a bis(p-dialkylaminoaryl)methane having the herein defined formula

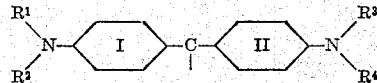

and substituted derivatives of pyrrolidino, piperidino, morpholino and piperazino in which the substituents are selected from the group consisting of alkyl up to 18 carbon atoms; octadecenyl; cycloalkyl and condensed cycloalkyl in which the rings contain 5 to 6 carbon atoms; lower alkyloxy; lower hydroxyalkyl; lower hydroxyalkoxy; phenyl-lower alkyl; mononuclear hydrocarbon aryl; mononuclear hydrocarbon aroxy; fluorine; chlorine; bromine; nitro; di-lower alkylamino; lower alkanoylamino, and —$SO_2NH_2$.

2. Bis(p-di-lower alkylaminophenyl)methane in which one hydrogen atom of the methane carbon atom is unsubstituted and the other hydrogen atom is substituted by a saturated heterocyclic radical which consists of saturated carbon atoms, hydrogen atoms and one nitrogen atom, said nitrogen atom forming the linking point of said radical to the methane carbon atom and being part of a heterocyclic ring which contains 5 ring members, the other ring members being carbon atoms.

3. Bis(p-di-lower alkylaminophenyl)methane in which one hydrogen atom of the methane carbon atom is unsubstituted and the other hydrogen atom is substituted by a saturated heterocyclic radical which consists of saturated carbon atoms, hydrogen atoms and one nitrogen atom, said nitrogen atom forming the linking point of said radical to the methane carbon atom and being part of a heterocyclic ring which contains 6 ring members, the other ring members being carbon atoms.

4. Bis(p-dimethylaminophenyl)methane in which one hydrogen atom of the methane carbon atom is unsubstituted and the other hydrogen atom is substituted by a piperidine radical consisting of saturated carbon atoms, hydrogen atoms and a nitrogen atom which forms the linking point of said radical to the methane carbon atom.

5. Bis(p-di-lower alkylaminophenyl)methane in which one hydrogen atom of the methane carbon atom is unsubstituted and the other hydrogen atom is substituted by a saturated heterocyclic radical which consists of saturated carbon atoms, hydrogen atoms, one oxygen atom and one nitrogen atom, said nitrogen atom forming the linking point of said radical to the methane carbon atom and said oxygen and nitrogen atoms being parts of a heterocyclic ring which contains 6 ring members, the other ring members of which are carbon atoms, and each of said oxygen and nitrogen atoms being linked to two different adjacent carbon atoms of said ring.

6. Bis(p-dimethylaminophenyl)methane in which one hydrogen atom of the methane carbon atom is unsubstituted and the other hydrogen atom is substituted by a morpholine radical consisting of saturated carbon atoms, hydrogen atoms, an oxygen atom, and a nitrogen atom which forms the linking point of said radical to the methane carbon atom.

7. Bis(p-di-lower alkylaminophenyl)methane in which one hydrogen atom of the methane carbon atom is unsubstituted and the other hydrogen atom is substituted by a saturated heterocyclic radical which consists of saturated carbon atoms, hydrogen atoms and two nitrogen atoms, one of said nitrogen atoms forming the linking point of said radical to the methane carbon atom and said nitrogen atoms being part of a heterocyclic ring which contains 6 ring members, the other ring members of which are carbon atoms, and each of said nitrogen atoms being linked to two different adjacent carbon atoms of said ring.

8. Bis(p-dimethylaminophenyl)methane in which one hydrogen atom of the methane carbon atom is unsubstituted and the other hydrogen atom is substituted by a piperazine radical consisting of saturated carbon atoms, hydrogen atoms and two nitrogen atoms, one of which nitrogen atoms forms the linking point of said radical to the methane carbon atom.

9. 1-[bis(p-dimethylaminophenyl)methyl]pyrrolidine.
10. 1-[bis(p-dimethylaminophenyl)methyl]piperidine.
11. 1-[bis(p-dimethylaminophenyl)methyl]piperazine.
12. 4-[bis(p-dimethylaminophenyl)methyl]morpholine.
13. 1,4 - bis[bis(p - diethylaminophenyl)methyl]piperazine.
14. 1,4-bis[bis(p-dimethylaminophenyl)methyl]piperazine.

References Cited in the file of this patent

UNITED STATES PATENTS

| | | |
|---|---|---|
| 2,709,619 | Morren | May 24, 1955 |
| 2,828,341 | Adams | Mar. 25, 1958 |
| 2,828,342 | Adams | Mar. 25, 1958 |

OTHER REFERENCES

Sommelet: Comp. rend., vol. 175, pp. 1149–51 (1922).
Christian: Bull. Soc. Chim. Belg., vol. 33, pp. 483–90 (1924).
Beilstein: vol. 13, p. 307 (1930).
Maxin: Bull. Soc. Chim. 5, vol. 3, pp. 1084–93 (1936), Abst. from Chem. Abst., vol. 30, p. 5989 (1936).
Cromwell: Jour. Amer. Chem. Soc., vol. 69, pp. 1857–60 (1947).